United States Patent Office 3,838,164
Patented Sept. 24, 1974

---

3,838,164
CROSSLINKING MONOMERS CONTAINING THE 1 - AZA - 3,7 - DIOXABICYCLO[3.3.0]OCTANE STRUCTURE
Richard J. Himics, Lake Hiawatha, N.J., assignor to Sun Chemical Corporation, New York, N.Y.
No Drawing. Continuation-in-part of application Ser. No. 44,534, June 8, 1970, now Patent No. 3,759,942. This application Nov. 15, 1972, Ser. No. 306,541
Int. Cl. C07d 85/26
U.S. Cl. 260—307 F
4 Claims

ABSTRACT OF THE DISCLOSURE

Derivatives of 1-aza-5-hydroxymethyl-3,7-dioxabicyclo [3.3.0] octane are radiation-curable and suitable for use in printing inks, coating compositions, adhesives, and the like.

---

This application is a continuation-in-part of copending application Ser. No. 44,534, filed June 8, 1970, now U.S. Pat. No. 3,759,942.

This invention relates to new and novel organic compounds and, more particularly, to radiation-curable derivatives of 1 - aza - 5 - hydroxymethyl - 3,7 - dioxabicyclo [3.3.0] octane.

In accordance with this invention esters and salts having the structure

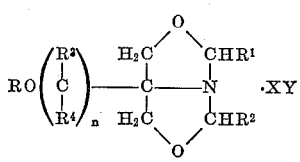

wherein R is

—C(O)CH=CH$_2$, —C(O)C=CH$_2$, —C(O)CH$_2$C=CH$_2$,
              |                    |
              CH$_3$                COOH

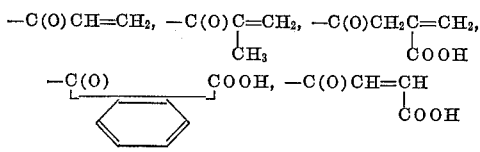

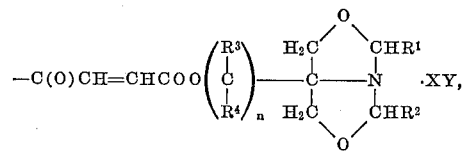

or the like; R$^1$, R$^2$, R$^3$, and R$^4$ is each hydrogen, —C$_6$H$_5$, an alkyl group having from 1 to 20 carbon atoms, an aryl or an alkyl group having halogen, mercaptan, disulfide, alkene, peroxy, carbonyl, amide, amine, carboxyl, hydroxyl, or the like, substitution and may be the same or different; n is an integer from 0 to 20; XY may be absent, or X may be hydrogen, an alkyl group having 1 to 20 carbon atoms, phenyl, benzyl, substituted phenyl, substituted benzyl, or other condensed aromatic radical, or the like, and Y may be a halogen, a picrate radical, a p-toluenesulfonate radical, —HSO$_4$, —H$_2$PO$_4$, —NO$_3$, or the like, or Y may be absent and X may be BF$_3$, FeCl$_3$, AlCl$_3$, or the like, have been prepared which are radiation-susceptible, making them suitable for a variety of end uses, such as for example inks, coating composition, adhesives, textile and paper finishing agents, and the like.

The monomeric esters are produced, for example, by reacting 1-aza-5-hydroxymethyl-3,7-dioxabicyclo [3.3.0] octane (II) with an appropriate reactant, e.g., an acid chloride, acid anhydride, or alkyl ester, in an inert solvent at a temperature of about —5° to 150° C. The general reaction for preparing these esters and salts may be illustrated by the following equations in which R, R$^1$, R$^2$, R$^3$, R$^4$, X, and n are as defined above and Z is halogen, alkoxy, or a carboxy-substituted alkyl group having about 1 to 20 carbon atoms:

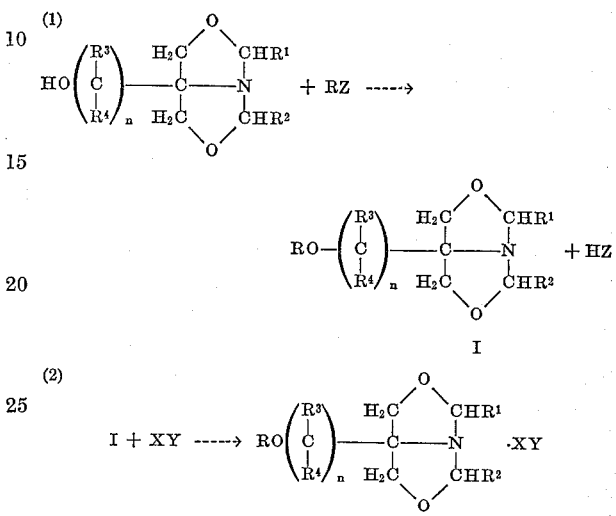

Examples of the monomers include, but are not limited to, 1-aza-5-acryloxymethyl-3,7-dioxabicyclo [3.3.0] octane, 1 - aza - 5 - methacryloxymethyl - 3,7-dioxabicyclo [3.3.0] octane, 1-aza-5-itaconyloxymethyl-3,7-dioxabicyclo [3.3.0] octane, and the following substituted 1-aza-3,7-dioxabicyclo [3.3.0] octanes:

1-aza-2-propyl-5-acryloxymethyl-3,7-dioxabicyclo [3.3.0] octane,
1-aza-2-propyl-5-methacryloxymethyl-3,7-dioxabicyclo [3.3.0] octane,
1-aza-2,8-dipropyl-5-acryloxymethyl-3,7-dioxabicyclo [3.3.0] octane,
1-aza-2,8-dipropyl-5-methacryloxymethyl-3,7-dioxabicyclo [3.3.0] octane,
1-aza-2-phenyl-5-acryloxymethyl-3,7-dioxabicyclo [3.3.0] octane,
1-aza-2,8-diphenyl-5-acryloxymethyl-3,7-dioxabicyclo [3.4.0] octane,
1-aza-2,8-diphenyl-5-methacryloxymethyl-3,7-dioxabicyclo [3.3.0] octane,
1-aza-2-(4'-chlorophenyl)-5-acryloxymethyl-3,7-dioxabicyclo [3.3.0] octane,
1-aza-2,8-di(4'-chlorophenyl)-5-acryloxymethyl-3,7-dioxabicyclo [3.3.0] octane,
1-aza-2-(4'-chlorophenyl)-5-methacryloxymethyl-3,7-dioxabicyclo [3.3.0) octane,
1-aza-2,8-di-(4'-chlorophenyl)-5-methacryloxymethyl-3,7-dioxabicyclo [3.3.0] octane,
1-aza-2-(3',4'-dichlorophenyl)-5-acryloxymethyl-3-7-dioxabicyclo [3.3.0] octane,
1-aza-2-(3',4'-dichlorophenyl)-5-methacryloxymethyl-3,7-dioxabicyclo [3.3.0] octane,
1-aza-2-(2',4'-dichlorophenyl)-5-acryloxymethyl-3,7-dioxabicyclo [3.3.0] octane,
1-aza-2-(2',4'-dichlorophenyl)-5-methacryloxymethyl-3,7-dioxabicyclo [3.3.0] octane,
1-aza-2-(4'-methoxyphenyl)-5-acryloxymethyl-3,7-dioxabicyclo [3.3.0] octane,
1-aza-2,8-di(4'-methoxyphenyl)-5-acryloxymethyl-3,7-dioxabicyclo [3.3.0] octane, 1-aza-2-(4'-methoxyphenyl)-5-methacryloxymethyl-
  3,7-dioxabicyclo [3.3.0] octane,
1-aza-2,8-di-(4'-methoxyphenyl)-5-methacryloxymethyl-
  3,7-dioxabicyclo [3.3.0] octane,
1-aza-2-(4'-nitrophenyl)-5-acryloxymethyl-3,7-
  dioxabicyclo [3.3.0] octane,
1-aza-2,8-di (4'-nitrophenyl)-5-acyloxymethyl-3,7-
  dioxabicyclo [3.3.0] octane,
1-aza-2-(4'-nitrophenyl)-5-methacryloxymethyl-3,7-
  dioxabicyclo [3.3.0] octane,
1-aza-2,8-di-(4'-nitrophenyl)-5-methacryloxymethyl-
  3,7-dioxabicyclo [3.3.0] octane,
2,2'-bi(1-aza-5-acryloxymethyl-3,7-dioxabicyclo
  [3.3.0] octane),
2,2'-bis(1-aza-5-methacryloxymethyl-3,7-dioxabicyclo
  [3.3.0] octane),
1-aza-2-(4'-nitrophenyl)-5-itaconyloxymethyl-3,7-
  dioxabicyclo [3.3.0] octane,
1-aza-2-4'-methoxyphenyl-5-itaconyloxymethyl-3,7-
  dioxabicyclo [3.3.0] octane, and the like, and their salts, and mixtures thereof.

The reaction with acid chloride is carried out at temperatures ranging from about −5° to 150° C., with temperatures of about 0° to 10° C. being preferred. The reaction pressure may range from about 5 to 50 p.s.i, preferably about 10 to 20. In general the reaction takes place in an inert organic solvent, e.g., benzene, toluene, xylene, chloroform, methylene chloride, ethylene dichloride, carbon tetrachloride, or the like.

Although generally equimolar amounts of 1-aza-5-hydroxymethyl-3,7-dioxybicyclo [3.3.0] octane (II) and the acid chloride are employed in the reaction, the ratio of II to the acid chloride may range from about 3 to 1:1 to 2.

Optionally an HCl scavenger may be used, such as for example triethylamine, tripropylamine, tributylamine, butyldimethylamine, triamylamine, amyldiethylamine, amyldimethylamine, or the like, in an amount ranging from about 25 to 300, and preferably about 75 to 150, percent, based on the weight of the reactants.

If desired, the reaction may be carried out by the ester interchange method of interacting a lower alkyl ester of methacrylic acid, acrylic acid, or itaconic acid with their alcohol in the presence of a suitable catalyst, such as for example dibutyltin oxide, dimethyltin oxide, diphenyltin oxide, aluminum isopropoxide, titanium tetraisopropoxide, titanium tetrabutoxide, tetraisopropyl titanate, tetrabutyl titanate, and the like, and their mixtures, in amounts ranging from about 0.05 to 4, and preferably about 0.2 to 0.8, percent, based on the weight of the reactants.

Useful inhibitors include hydroquinone, catechol, 1,4-naphthaquinone, o-xyloquinone, p-toluoquinone, tetrachloro-p-benzoquinone, trichloroquinone, phenanthrene quinone, pyogallol, phenothiazine, or a dry oxygen sparge in combination with any of the above.

The starting alcohols may be prepared by known procedures which form no part of the instant invention. Thus, for example, 1 - aza - 5 - hydroxymethyl-3,7-dioxybicyclo [3.3.0] octane can be readily prepared by the methylolation of tris(hydroxymethyl) aminomethane (THAM) according to the following equation:

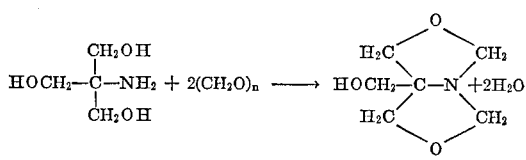

Substituted 1-aza-3,7-dioxabicyclo [3.3.0] octanes may be prepared in a similar way by using THAM with the appropriate aldehyde or ketone.

By way of illustration, new monomers may be prepared by the following steps:

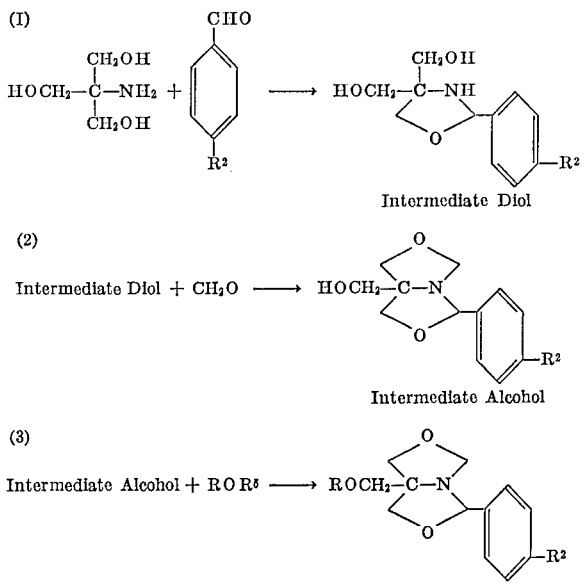

wherein $R^2$ is —$OCH_3$ or —$NO_2$; R is an acrylate, methacrylate, or itaconate radical; and $R^5$ is a $C_{1-5}$ alkyl group.

Instead of THAM, suitable beta-alkylol amines may be used.

The esters thus-formed may be converted into novel salts by reaction with, for example, p-toluene sulfonic acid, picric acid, methyl chloride, methyl bromide, methyl iodide, boron trifluoride, hydrochloric acid, nitric acid, phosphoric acid, and so forth, for use in, e.g., polymerizable dyes by dye/monomer salt formation, polymerizable emulsifying agents, water-solubilizing comonomers, surface-active agents, radiation-crosslinkable films, polymerizable chemical catalysts, and as radiation-sensitive water-soluble crosslinking agents.

In addition, copolymers may be prepared by copolymerizing at least one of these esters or salts with at least one copolymerizable ethylenically unsaturated monomer, i.e., a monomer containing a $CH_2=C<$ group, a —$CH=CH<$ group, a —$CH=C<$ group, or a $>C=C<$ group, such as for example acrylic acid, methacrylic acid, or itaconic acid; esters of acrylic acid, methacrylic acid, itaconic acid, maleic acid, fumaric acid, or citraconic acid with a monohydric alcohol, such as methyl, ethyl, propyl, butyl, cyclohexyl, octyl, dodecyl, cyanoethyl, amino-ethyl, and the like; vinyloxyalkyl esters such as vinyloxyethyl acetate; vinyl ethers such as vinyl ethyl ether, vinyl butyl ether, hydroxyethyl vinyl ether, aminopropyl vinyl ether, dimethylaminoethyl vinyl ether, and vinyloxypropoxyethanol; methacrylonitrile or acrylonitrile; acrylamide or methacrylamide and their N-substituted derivatives; vinyl esters such as vinyl chloride, vinyl bromide, vinyl acetate, vinyl butyrate, vinyl propionate, and vinyl stearate; vinylidene esters such as vinylidene chloride, vinylidene fluoride, and vinylidene cyanide; 1-chloro-1-fluoroethylene; ethylene; styrene; substituted styrenes such as methylstyrene, dimethylstyrene, and halogenated styrenes; vinyl ketones such as methyl vinyl ketone, ethyl vinyl ketone, and vinyl phenyl ketone; hydroxy compounds such as ethylene glycol monoacrylate and monomethacrylate, glycerol monoacrylate, hydroxyethyl methacrylate, and glycidyl methacrylate; pyridines such as 2-vinylpyridine and 2-methyl-5-vinylpyridine; chloroprene and isoprene; cyclopentadiene and substituted cyclopentadienes; and the like.

In making the copolymers the monomers are copolymerized at a reaction temperature in the range of about 50° C. to 150° C., preferably about 60 to 100° C., and a reaction time of about 2 to 24 hours, preferably about 4 to 8 hours, in the presence of a polymerization initiator or catalyst. The monomers are reacted in amounts ranging from about 1 to 99 parts by weight of the ester or salt of copending application S.N. 44,534 and 99 to 1 parts of the comonomer; preferably the amounts are about 20 to 80: about 80 to 20 parts by weight. Suitable initiators include azo compounds, such as azobisisobutyronitrile and p-methoxyphenyl diazothio (2-naphthyl) ether, and organic peroxygen compounds such as lauryl peroxide, acetyl peroxide, isopropyl percarbonate, and t-butyl peroxy pivalate.

The copolymerization process is preferably, although not necessarily, carried out in an inert liquid reaction medium. Examples include aliphatic and aromatic hydrocarbons such as pentane, hexane, heptane, heptene-1, isooctane, cyclohexene, cyclohexane, benzene, toluene, xylene; alkylates; methylene chloride and ethylene chloride; ketones; alcohols; water; and the like; and mixtures thereof. The amount of solvent may range up to about 80 parts by weight of the copolymer; preferably the range is about 30 to 70 parts.

Although the monomers and copolymers may be cured thermally or in the presence of free-radical producing agents, curing preferably takes place when the monomer or copolymer is exposed to a source of radiation, e.g., ultraviolet light or election beam radiation, under normal aerobic conditions.

The monomers and copolymers exhibit extremely fast photocure rates which are attributed to participation of the organic residue in a radiation-catalyzed photo-oxidation.

It is believed that the active principle whereby the monomers and polymers enter the accelerated crosslinking/grafting reactions is essentially a photooxidation of the bicyclic moiety followed by rapid decomposition of the initial hydroperoxide leading to the generation of radicals that can participate in a crosslinking reaction.

Reactive intermediates can account for the rapid cure and crosslinking mechanisms. For example, free radicals formed by decomposition of reactive intermediates can initiate polymerization and abstract hydrogen atoms to generate free radicals at crosslinking sites.

The good cure rates of these materials may be further improved, if desired, by the addition of a photoinitiator. Any suitable photoinitiator or sensitizer may be used, such as for example an acyloin, such as benzoin; an acyloin derivative, such as benzoin methyl ether, benzoin ethyl ether, desyl bromide, desyl chloride, desyl amine, and the like, and mixtures thereof; a halogenated aliphatic, aromatic, or alicyclic hydrocarbon or a mixture thereof, wherein the halogen may be chlorine, bromine, iodine, or fluorine, including, for example polyhalogenated polyphenyl resins; chlorinated rubbers, such as the Parlons (Hercules Powder Co.); copolymers of vinyl chloride and vinyl isobutyl ether, such as Vinoflex MP-400 (BASF Colors and Chemicals Inc.); chlorinated aliphatic waxes, such as Chlorowax 70 (Diamond Alkali Co.); perchloropentacyclodecane, such as Dechlorane+ (Hooker Chemical Co.); chlorinated paraffins, such as Clorafin 40 (Hooker Chemical Co.) and Unichlor-70B (Neville Chemical Co.); the Hetrons (Hooker Chemical Co.); mono-and polychlorobenzenes; mono- and polybromobenzenes; mono- and polychloroxylenes; mono- and polybromoxylenes; dichloromaleic anhydride; 1-(chloro-2-methyl) naphthalene; 2,4-dimethylbenzene sulfonyl chloride; 1-bromo-3-(m-phenoxyphenoxy benzene); 2-bromoethyl methyl ether; chlorendic anhydride; chloromethylnaphthyl chloride; chloromethyl naphthalene; bromomethyl phenanthrene; diiodomethyl anthracene; hexachlorocyclopentadiene; hexachlorobenzene; ketones, such as benzophenone, acetophenone, ethyl methyl ketone, benzil, cyclopentanone, caprone, benzoyl cyclobutanone, and dioctyl acetone; substituted ketones such as N,N-dimethylamino benzophenone, tribromoacetophenone, and trichloroacetophenone; polynuclear quinones such as benzoquinone and anthraquinone; substituted polynuclear quinones such as 1-chloroanthraquinone, 2-methylanthraquinone, and 2,3-diphenyl-anthraquinone; and so forth; and mixtures of these. In addition, amine accelerators such as n-propylamine, triethanolamine, and the like, as well as photo-oxidation promoters such as rose bengal, eosin, and methylene blue may be used in conjunction with the photosensitizers.

The ratio of the amount of the monomer or copolymer to the photoinitiator in the composition may range from about 98:2 to about 20:80, and preferably from about 80:20 to about 20:80.

Conventional colorants, i.e., pigment or dyes, may be used in conventional quantities in the formulations of this invention. Suitable organic and inorganic pigments include carbon black, zinc oxide, titanium dioxide, phthalocyanine blue, phthalocyanine green, benzidine yellow, naphthol yellow lake, cadmium orange, cadmium yellow, chrome yellow, Prussian blue, bronze blue, chrome green, peacock blue lake, milori blue, ultramarine blue, red lake C, para red, toluidine red, sodium lithol red, barium lithol red, lithol rubine, molybdated scarlet chrome, ferric oxide, aluminum hydrate, and the like. The vehicle may be used, for example, in an amount ranging from about 20 to 99.9 percent of the weight of the total composition and a colorant from about 0.1 to 80 percent of the weight of the total composition.

Other commonly known modifiers can be incorporated into the formulations using the compounds of the present invention. These include monomeric solvents; plasticizers; wetting agents for the colorant, such as dichloromethylstearate and other chlorinated fatty esters; leveling agents, such as lanolin, paraffin waxes, and natural waxes; and the like. Such modifiers are generally used in amounts ranging from about 1 to 3 percent by weight, preferably about 1 percent, based on the total weight of the formulation.

The formulations may be prepared in any convenient manner, such as, for example, in a three-roll mill, a sand mill, a ball mill, a colloid mill, or the like, in accordance with known dispersion techniques. The resulting composition is applied in any suitable manner onto a substrate.

Variables which determine the rate at which a radiation-curable composition will dry include the specific ingredients in the composition, the concentration of the photoinitiator, the thickness of the material, the nature and intensity of the radiation source and its distance from the material, the presence or absence of oxygen, and the temperature of the surrounding atmosphere. Irradiation may be accomplished by any one or a combination of a variety of methods. The composition may be exposed, for example, to actinic light from any source and of any type as long as it furnishes an effective amount of ultraviolet radiation, since the compositions of this invention activatable by actinic light generally exhibit their maximum sensitivity in the range of about 1800 A. to 4000 A., and preferably about 2000 A. to 3000 A.; electron beams; gamma radiation emitters; and the like; and combinations of these. Suitable sources include, but are not limited to, carbon arcs, mercury-vapor arcs, fluorescent lamps with special ultraviolet light-emitting phosphors, argon glow lamps, photographic flood lamps, Van der Graaff accelerators, Resonant transformers, Betatrons, linear accelerators, gamma radiation emitters, and so forth, and combinations of these.

The time of irradiation must be sufficient to give the effective dosage. Irradiation may be carried out at any convenient temperature, and most suitably is carried out at room temperature for economic reasons. Distances of the radiation source from the work may range from about ⅛ to 10 inches, and preferably from about ⅛ to 7 inches.

The novel compounds of this invention cure rapidly to films that are flexible; possess good adhesion to many substrates; have good shelf stability; have good resistance to organic solvents and water; and are rub-resistant. Inks, coatings, adhesives, and the like made from the compounds of this invention are solvent-free and dry almost instantaneously in air at ambient temperature, thus eliminating the need for ovens as well as avoiding the air pollution, fire hazards, odor, and so forth, that accompany the use of volatile solvents. The inks and coatings form extremely hard and durable films on a wide variety of substrates, such as, for example, paper; newsprint; coated paper stock; irregular, e.g., corrugated, board; metal, e.g., foils, meshes, cans, and bottle caps; wood; rubbers; polyesters, such as polyethylene terephthalate; glass; polyolefins, such as treated and untreated polyethylene and polypropylene; cellulose acetate; fabrics such as cotton, silk, and rayon; and the like. They exhibit no color change in the applied film when subjected to the required curing conditions and they are resistant to flaking; smudging; salt spray; scuffing; rubbing; and the deteriorating effects of such substances as alcohols, oils, and fats: In addition, the compounds of this invention withstand both heat and cold, making them useful, for example, in printing inks or coatings for containers that must be sterilized, e.g., at about 150° C. under pressure, and/or refrigerated, e.g., at less than −20° C.; and so forth. They can be used in textile and paper treating systems. Because they cure on weathering to crosslinked water-resistant substances, these compounds are suitable for use as overcoats for substrates such as wood, metal, concrete, and non-durable plastics.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein. Unless otherwise specified, all parts are given by weight.

EXAMPLE I

A. 1-Aza-5-Acryloxymethyl-3,7-Dioxabicyclo [3.3.0] Octane (ADOZ)

To a 1-liter, three-necked reaction flask equipped with stirring motor, reflux condenser, addition funnel, calcium chloride drying tube, and nitrogen inlet was added 290 parts (0.20 mole) of 1-aza-5-hydroxymethyl-3,7-diazabicyclo [3.3.0] octane dissolved in 710 ml. of benzene. To this was added 0.5 part of hydroquinone and 40.5 parts (0.4 mole, 100 percent excess) of triethylamine, and the resultant solution was cooled with stirring to 0° C. A nitrogen gas sweep was started, and 18.0 parts (0.20 mole) of acryloyl chloride dissolved in 40 ml. of benzene was added dropwise over a five-hour period, the reaction temperature being maintained at 0–5° C. by means of an ice-water bath. The mixture was stirred overnight at room temperature and then filtered. 23.2 Parts (84.4 percent) of triethylamine hydrochloride was isolated. The filtrate was washed three times with saturated cold NaCl solution, dried with anhydrous magnesium sulfate, and stripped on a rotary evaporator. A yellow solid was isolated and recrystallized three times from acetone in a Dry Ice bath to give a white solid melting at 46–47° C. (55 percent of theory) and identified as 1-aza-5-acryloxymethyl-3,7-dioxabicyclo [3.3.0] octane (ADOZ).

Its IR spectrum showed the following absorptions (microns): 5.82 (carbonyl), 6.12 (vinyl), 8.10 (ester), and 12.3 (vinyl). The monomer exhibited a UV spectrum typical of acrylates, showing a strong absorption at 210 mu, a weak band at 252 mu, a shoulder at 272 mu, and a broad band centered at 324 mu.

Analysis of $C_9H_{13}NO_4$:

|  | C | H | N | O |
| --- | --- | --- | --- | --- |
| Calculated | 54.26 | 6.58 | 7.03 | 32.13 |
| Found | 54.04 | 6.77 | 6.93 | 32.26 |

The crystalline solid monomer was soluble in water (~10%), methanol, benzene, ethylenedichloride, chloroform, ethyl ether, and acetone, and insoluble in hexane.

B. When exposed to radiation at a distance of 3 inches from a 550-watt ultraviolet lamp for less than 1 second, a thin deposit of crystalline monomer could not be redissolved in the above solvents which are known to effect solution of the uncrosslinked polymerized monomer. When 50 parts of the monomer ADOZ was dissolved in 50 parts of the corresponding methacrylate (described in Example 2 below) as the reactive diluent and the uninitiated solution photolyzed at 1⅓ inch from a 2100-watt Hanovia lamp, the system cured in 15 seconds to a polymer film.

EXAMPLE 2

A. 1-Aza-5-Methacryloxymethyl-3,7-Dioxabicyclo [3.3.0] Octane (MADOZ)

To a 1-liter, 3-necked round-bottomed reaction flask equipped with a stirring motor, a thermometer, distilling head, reflux condenser, air inlet, and heating mantle was added 514 parts (4.5 moles) of ethyl methacrylate, 132 parts (0.9 mole) of 1-aza-5-hydroxymethyl-3,7-dioxabicyclo [3.3.0] octane, 3.0 parts of dibutyltin oxide, and 6.0 parts of hydroquinone. The reaction mixture was stirred with air being introduced below the surface and heated to reflux for about one hour. The ethanol-ethyl methacrylate azeotrope (b.p. 83–100° C.) was collected, amounting to about 100 ml. In a period of over about nine hours the pot temperature went from 118° to 130° C. and the vapor temperature rose rapidly near the end to 115° C. The reaction solution was filtered and stripped on the rotary evaporator to give a dark liquid which was distilled to give a main product fraction (b.p. 90–96°/ 0.2 mm.) amounting to 155 parts (81 percent of theory). Redistillation gave a clear liquid (b.p. 85°/0.2 mm., $n_D^{25}$ 1.4795) which was shown to be greater than 96 percent pure by gas-liquid phase chromatography analysis through a 20% Carbowax 20 M on 60–80 Chromosorb W column at 200° C. The IR spectrum of the product, 1 - aza - 5 - methacryloxymethyl-3,7-dioxabicyclo [3.3.0] octane (MADOZ), showed the following significant absorptions (microns): 5.8 (carbonyl), 6.15–6.20 (vinyl), 8.4–8.6 (ester), and 12.2 (vinyl). The monomer's UV spectrum (methanol) showed major absorptions at 212 mµ and 245 mµ (shoulder).

|  | C | H | N | O |
| --- | --- | --- | --- | --- |
| Calculated | 56.32 | 7.09 | 6.57 | 30.02 |
| Found | 56.29 | 7.24 | 6.56 | 29.91 |

It was partially soluble in water; insoluble in hexane; and soluble in methanol, benzene, and ethylenedichloride.

B. The monomer was exposed to ultraviolet radiation as in Example 1 (B). It cured to a non-sticky flexible film in about 20 seconds.

C. A mixture of 70 parts of the monomer of Part (A) and 30 parts of benzophenone was exposed to ultraviolet radiation as in Example 1 (B). The mixture cured to a dry flexible film in about 3.5 seconds.

EXAMPLE 3

1-Aza-2-(p-methoxyphenyl)-5-Acryloxymethyl-3,7-Dioxabicyclo [3.3.0] Octane

A. Condensation of Tris(hydroxymethyl)methane (THAM) with Anisaldehyde.—To a 3-liter flask equipped with a stirring motor, reflux condenser, thermometer, and Dean-Stark trap was added 1000 ml. of benzene, 242 g. (2.0 mole) of THAM, and 272 g. (2.0 mole) of anisaldehyde. The heterogeneous mixture was refluxed for 10 hours at which time 34.5 ml. (96%) of water was collected.

To the resulting cooled reaction mixture containing the unisolated intermediate diol was added 66.0 g. of paraformaldehyde (2.2 mole, 10% excess) and refluxing was resumed for 7 hours to collect 4 ml. (94%) of the water of condensation.

The crude reaction solution was cooled to 0°–5° C. and filtered to remove excess paraformaldehyde. The filtrate was stripped of solvent on the rotary evaporator at reduced pressure to yield 461 g. (93%) of the viscous, yellow intermediate alcohol.

About 195 g. of the crude alcohol was distilled under vacuum to yield three major fractions: (1) b.p. 21–70° C./0.15 mm., (2) b.p. 76–123° C./0.15–0.2 mm., and (3) b.p. 172–180° C./0.4 mm. Fraction (3) was the major product fraction which collected as a clear colorless liquid but yellowed on standing.

B. Acrylation of the Intermediate Alcohol.—To a 1-liter flask equipped with mechanical stirrer, thermometer, fractionation column with reflux condenser and take-off arm, and air inlet/exit tubes was added 155 g. (5 × 0.29 mole) of ethyl acrylate, 72.2 g. (0.29 mole) of intermediate alcohol from part (A), 2.2 g. of dibutyltin oxide (3% on alcohol), and 0.8 g. of phenothiazine (0.5% on ethyl acrylate).

The reaction mixture was heated under an air sparge 4–5 liters/hour while maintaining a pot temperature of 104–108° C. and a vapor temperature of 74–94° C. Most of the ethanol/ethyl acrylate azeotrope was collected at 74–84° C. (30 ml.), with approximately 5 ml. being collected at 84–94° C. The reaction was ended when no drop in the vapor temperature at 94° C. was observed with no reflux takeoff.

The crude reaction solution was stripped on the rotary evaporator at reduced pressure and distilled to yield two major fractions: (1) b.p. 10–175° C./0.2 mm., and (2) b.p. 175–190° C./0.8–0.2 mm.

Approximately 24.3 g. of Fraction 2 above was redistilled to give a center cut (b.p. 173° C./0.2 mm. $n_D^{23.5}$, 1.543). The IR spectrum was consistent with the expected structure.

Analysis of $C_{16}H_{19}NO_5$:

|  | C | H | N |
|---|---|---|---|
| Calculated | 62.94 | 6.27 | 4.59 |
| Found | 62.88 | 6.43 | 4.40 |

EXAMPLE 4

1-Aza-2-(p-nitrophenyl)-5-Acryloxymethyl-3,7-Dioxabicyclo [3.3.0] Octane

A. Condensation of THAM with p-Nitrobenzaldehyde.—To a 250 ml. reaction flask equipped with a stirring motor, reflux condenser, thermometer, and Dean-Stark trap was added 167 ml. of benzene, 31.6 g. (0.209 mole) of p-nitrobenzaldehyde, and 25.3 g. (0.209 mole) of THAM. The reaction mixture was heated to reflux for 4.5 hours until 3.5 ml. (93%) of the water of condensation was collected. The product was isolated by filtration to give 52 g. (98%) of yellow solid (m.p. 101–107° C.). Recrystallization of the intermediate diol from a solvent composition of 200 ml. of ethanol and 20 ml. of acetone gave 40.6 g. (78%) of solid (m.p. 104–106° C.).

B. Condensation of the Intermediate Diol with Paraformaldehyde.—Approximately 68.8 g. (0.27 mole) of recrystallized intermediate diol from part (A) was condensed with 8.9 g. (0.296 mole, 10% excess) of paraformaldehyde in 500 ml. of benzene. After refluxing for 6.5 hours, about 4.85 ml. (99%) of water was collected, and the warm solution was filtered to remove excess paraformaldehyde. The reaction solution was cooled with an ice-water bath to precipitate product and filtered to yield 59.2 g. (82%) of the intermediate alcohol (m.p. 85° C.).

C. Acrylation of the Intermediate Alcohol.—Approximately 59.0 g. (0.222 mole) of the intermediate alcohol from part (B) was reacted with 111 g. (5×0.222 mole) of ethyl acrylate in the presence of 1.77 g. of dibutyltin oxide as catalyst and 0.5 g. of phenothiazine as inhibitor.

In addition, an air sparge of 4–5 liters/hour was maintained throughout the reaction. After 3 hours at a pot temperature of 102–109° C., approximately 33 ml. of ethanol/ethyl acrylate azeotrope was collected, boiling mainly at 74–84° C. Approximately 160 ml. of hexane was added to the collected, boiling mainly at 74–84° C. Approximately 160 ml. of hexane was added to the cooled reaction solution to precipitate 63 g. (89%) of an off-white solid (m.p. 88–98° C.). Three recrystallizations from warm methanol gave a white solid (m.p. 110–111.5° C.). The IR spectrum was consistent with the expected structure.

Analysis of $C_{15}H_{16}N_2O_6$:

|  | C | H | N |
|---|---|---|---|
| Calculated | 56.24 | 5.04 | 8.75 |
| Found | 56.49 | 5.07 | 8.47 |

EXAMPLE 5

ADOZ BF$_3$ Hydrate Salt

About 2.0 g. (0.01 mole) of ADOZ dissolved in 10 ml. of ethyl ether was added to 3.0 g. of boron trifluoride etherate (48% BF$_3$, est. 0.0212 mole) dissolved in 25 ml. of ether. A light tan oil deposited which crystallized on standing to give 2.15 g. (81%) of a tan solid (m.p. 65–75° C.).

Recrystallization from warm benzene/methanol gave a white solid (m.p. 100–101° C.), which showed strong alcohol or water absorption in the IR spectrum. Drying in the vacuum oven overnight at 60° C. gave back slightly dried material (vide infra) showing the following IR absorptions (microns): 3.2 (—OH), 5.75 (carbonyl), 6.12–6.2 (acrylate), 9–10 (no assignment), 12.5 (acrylate unsaturation).

Analysis of $C_9H_{13}NO_4BF_3H_2O$:

|  | C | H | N | F |
|---|---|---|---|---|
| Calculated | 37.92 | 5.30 | 4.91 | 20.00 |
| Found | 37.98 | 5.08 | 5.10 | 20.07 |

What is claimed is:

1. A compound having the structure

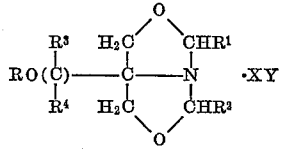

wherein R is

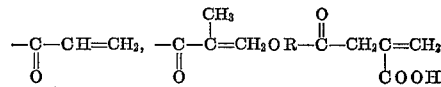

$R^1$, $R^3$, and $R^4$ is each hydrogen; $R^2$ is hydrogen and XY is boron trifluoride or $R^2$ is 4-methoxyphenyl or nitrophenyl and XY is absent.

2. 1 - aza-2-(p-methoxyphenyl)-5-acryloxymethyl-3,7-dioxabicyclo [3.3.0] octane.

3. 1 - aza - 2 - (p-nitrophenyl)-5-acryloxymethyl-3,7-dioxabicyclo [3.3.0] octane.

4. 1 - aza - 5 - acryloxymethyl-3,7-dioxabicyclo [3.3.0] octaneboron trifluoride salt.

References Cited

UNITED STATES PATENTS

| 3,738,992 | 6/1973 | Frump | 260—307 F |
| 3,759,942 | 9/1973 | Himics | 260—307 F |

RAYMOND V. RUSH, Primary Examiner

UNITED STATES PATENT OFFICE
CERTIFICATE OF CORRECTION

Patent No. 3,838,164     Dated September 24, 1974

Inventor(s) Richard J. Himics

It is certified that error appears in the above-identified patent and that said Letters Patent are hereby corrected as shown below:

Column 10, line 54, in the formulas change "OR" to --,OR--.

Column 10, line 56, after "R" change the period to a comma.

Column 10, line 64, insert a hyphen between "octane" and "boron".

Signed and sealed this 12th day of November 1974.

(SEAL)
Attest:

McCOY M. GIBSON JR.      C. MARSHALL DANN
Attesting Officer     Commissioner of Patents